United States Patent [19]

Pedersen et al.

[11] Patent Number: 5,067,106
[45] Date of Patent: Nov. 19, 1991

[54] RADIATION DETECTION AND SIGNAL DELAY CIRCUITRY FOR PROTECTING RECORDED DATA

[75] Inventors: Richard C. Pedersen, -Burnsville; Richard M. Sedro, Roseville, both of Minn.;

[73] Assignee: Control Data Corporation, Minneapolis, Minn.

[21] Appl. No.: 402,504

[22] Filed: Sep. 5, 1989

[51] Int. Cl.$^5$ ............................................. G06F 12/16
[52] U.S. Cl. ............................... 395/575; 364/969.3; 364/965.79; 364/DIG. 12
[58] Field of Search ... 364/200 MS File, 900 MS File; 369/54

[56] References Cited

U.S. PATENT DOCUMENTS

| | | |
|---|---|---|
| 3,638,022 | 1/1972 | Kozlov . |
| 3,772,662 | 11/1973 | Blair . |
| 3,777,074 | 12/1973 | Olmsted . |
| 3,800,158 | 3/1974 | Grosbard ..................... 250/515.1 |
| 4,199,810 | 4/1980 | Gunckel, II et al. .............. 364/200 |
| 4,413,327 | 11/1983 | Sabo et al. ........................ 364/900 |
| 4,556,757 | 12/1985 | Oberbach . |
| 4,609,520 | 9/1986 | Kronenberg .................... 376/153 |
| 4,688,112 | 8/1987 | Shoji et al. ....................... 360/60 |

Primary Examiner—Thomas M. Heckler
Attorney, Agent, or Firm—Haugen and Nikolai

[57] ABSTRACT

A radiation hardened or fail safe circuit is coupled between a peripheral data storage device, for example a disk drive, and its associated controller. The circuit includes an AND logic gate with two inputs: a write enable signal from the controller; and a sensing input logic signal normally high, but driven low responsive to the sensing of unacceptably high levels of radiation. A delay means is interposed between the controller and the AND gate, for delaying propagation of the write enable signal a sufficient amount of time to ensure that the sensing input to the AND gate responds to the detection of high radiation before the arrival of the write enable signal. The delay means can be an LC delay circuit, a coaxial cable, or a series of latches clocked in alternation order by opposite phases of an oscillator.

18 Claims, 3 Drawing Sheets

RADIATION DETECTION AND SIGNAL DELAY CIRCUITRY FOR PROTECTING RECORDED DATA

BACKGROUND OF THE INVENTION

This invention relates to computer memory devices, and more particularly to means for protecting the integrity of electronically recorded data from the effects of ionizing radiation.

It is well known that a nuclear event generates effects felt far beyond the immediate area of the explosion. Electronic data storage systems are vulnerable to destruction from shock and thermal effects which would destroy data by physical destruction or disabling of the system. A data processing system sufficiently distant from a nuclear event to avoid physical destruction or impairment, nonetheless may experience damage from nuclear radiation. More particularly, a brief but powerful gamma ray pulse, known as prompt gamma, is emitted during the event and propagates outwardly at a speed near that of light. An electromagnetic pulse (EMP) is emitted as well. Neutrons also are emitted at the time of the explosion, but travel outwardly at much slower velocities. Peripheral areas thus receive gamma ray and EMP components first, followed by a high intensity fast neutron pulse. These pulses can destroy the memories of computer systems, for example by writing over previously recorded data, massive system overloading, or introduction of spurious signals into the memory. Internal computer memories, as well as peripheral memory devices such as disk drives, tape drives, and the like, are subject to this risk.

The need to protect data processing systems and other equipment from radiation has lead to the development of protective shields or covers to surround such equipment. For example, U.S. Pat. No. 4,556,757 (Oberbach) discloses a protective cover against radiation including a plastic carrier foil and a thin metal layer steamed onto the carrier foil and connected to ground potential. The carrier foil and metal layer are disposed between two plastic protective foils. A magnetic shield for charged particles is disclosed in U.S. Pat. No. 3,800,158 (Grosbard). The shield is constructed of magnetized elements which can be shaped as truncated pyramids, with one magnetic pole at the top of each pyramid and the other magnetic pole at the base. On a much larger scale, thick walls or partitions of lead can be employed to protect structure interiors against radiation.

Such shielding usually is inconvenient or impractical. Techniques are known for the "radiation hardening" of semiconductor chips and other forms of circuitry utilized in computers and in data storage devices. These techniques can be prohibitively expensive, however, costing hundreds of thousands of dollars for the complete radiation protection of a single disk drive.

Accordingly, signal handling and radiation detection techniques have been developed for the purpose of protecting the data stored in systems which are not totally radiation hardened. For example, U.S. Pat. No. 4,413,327 (Sabo et al) is directed to a computer system with an internal computer memory and two redundant storage units. The redundant units are alternatively addressed and updated in rapid alternating succession such that even during data recording operations the redundant units contain substantially the same information. Should a nuclear event occur while information is being written into one of the redundant storage units, the other unit remains isolated and therefore unaffected. When the high radiation of the event has ceased, the previously isolated memory is located and information from this memory loaded back into the computer's internal memory. The system includes a radiation detector for activating the interrupt and restoring circuits. While perhaps satisfactory under certain circumstances, this type of system increases the cost of data processing by at least a doubling the memory, as well as at least doubling the time required to gain access to memory in operations involving memory.

Therefore, it is an object of the present invention to provide a means to secure magnetically recorded data against the effects of nuclear radiation, without requiring radiation shielding or memory redundancy.

Another object of the invention is to provide a system for electronically recording information in which signals enabling recording can not be provided to memory once a nuclear or other high radiation event is detected.

Another object is to provide a data processing system in which a write enabling signal is delayed in its transmission to memory for a sufficient length of time to enable the detection of radiation above an accepted maximum level, as well as a disassociation of memory from the source of the write enable signal.

Yet another object is to provide a reliable and inexpensive means for securing previously stored magnetic data against alteration due to the electromagnetic pulse of a nuclear event.

SUMMARY OF THE INVENTION

To achieve these and other objects, there is provided an apparatus for preserving the integrity of electronically recorded data in the event of exposure to radiation. The apparatus includes a memory for storing information and a data entry means operatively associated with the memory. When enabled, the data entry means records information onto the memory responsive to receiving electrical data signals representing the information. A control means is operatively associated with the data entry means, for providing the electrical data signals to the data entry means and for generating a first control signal to enable the data entry means to record information. A signal transmitting element, having alternative active and inactive states, is operatively connected between the controller and the data entry means. Conversely, the signal transmitting element provides an enabling signal to the data entry means when it is in the active state and is receiving the first control signal. The signal transmitting element provides a disabling signal to the data entry means whenever it is in the inactive state. The apparatus further has detection means including a radiation detector for sensing radiation and for generating a second control signal responsive to sensing radiation of at least a predetermined level. The detection means includes a connecting means for electrically coupling the detector and signal transmitting element, for providing the second control signal to the signal transmitting element to force the signal transmitting element into the inactive state. A radiation resistant delay means is electronically coupled between the control means and the signal transmitting element for delaying the propagation of the first control signal from the controller to the signal transmitting element. The propagation is delayed by a predetermined amount of time, at least as long as the time for propagation of the second control signal from the radiation detector to the signal transmitting element.

Preferably the first and second control signals are provided by digital logic signals from the control means and connecting means, respectively. Each of the control signals is one of two alternative logic states or voltage levels of its associated logic signal. The enable and disable signals preferably are the alternative voltage levels of a digital logic signal provided to the data entry means by the signal transmitting element.

One particularly advantageous approach involves using an AND logic gate with two inputs: the high voltage level as the first control signal, and the low voltage level as the second control signal. The enable signal is the high voltage output of the AND gate, and thus is present only when both inputs are high, corresponding to the presence of a write enable signal (first control signal) and the absence of the second control signal, i.e. a high voltage level corresponding to the absence of any detection of abnormally high radiation.

Alternatively, the signal transmitting element can be a NOR logic gate having two inputs, both of which must be at the low logic level in order to provide a high voltage level write enable signal as the NOR gate output.

A highly preferred delay means is an LC delay line, or a distributed delay line having two parallel conductive paths such as a coaxial cable. Yet another delay means, although substantially more expensive, is a circuit including a plurality of latches connected in series and an oscillator to provide clocking inputs to each of the latches, all in the form of a radiation hardened semiconductor chip.

The amount of time by which the first control signal is delayed depends upon several factors, including the nature of the radiation detecting device, and the composition and length of the signal conducting path between the detection device and the signal transmitting element. In most cases, however, a delay of about one hundred (100) nanoseconds is sufficient.

In a preferred embodiment, the memory is a rotatable disk having a recording surface or film of magnetizable material. A controller, coupled between a computer and a read/write preamplifier and magnetic transducing heads, provides a write enable signal to the preamplifier, whereupon a selected one of the transducers is actuated to write information on the recording surface. Preferably the information is recorded in separate data sectors on the recording surface.

A nuclear event, occurring while the system is not in a write mode, may generate a false write signal. However, in accordance with the present invention the false signal would be delayed at least until a signal indicating the presence of high level radiation had propagated from the radiation detector to the AND gate or other signal transmission element, thus disabling the write function to isolate and protect previously recorded data. A nuclear event occurring while data is being written could cause damage, but only to the data being written. The damage, if any, would be limited to the particular sector in which writing was in progress, again preserving previously recorded data. Thus, the present invention provides virtually the same protection afforded by a total radiation hardening of a complete memory, at a small fraction of the cost.

IN THE DRAWINGS

For a further understanding of the above and other features and advantages, reference is made to the following detailed description and drawings, in which.

DETAILED DESCRIPTION OF THE PREFERRED EMBODIMENTS

Figures 1, 2:
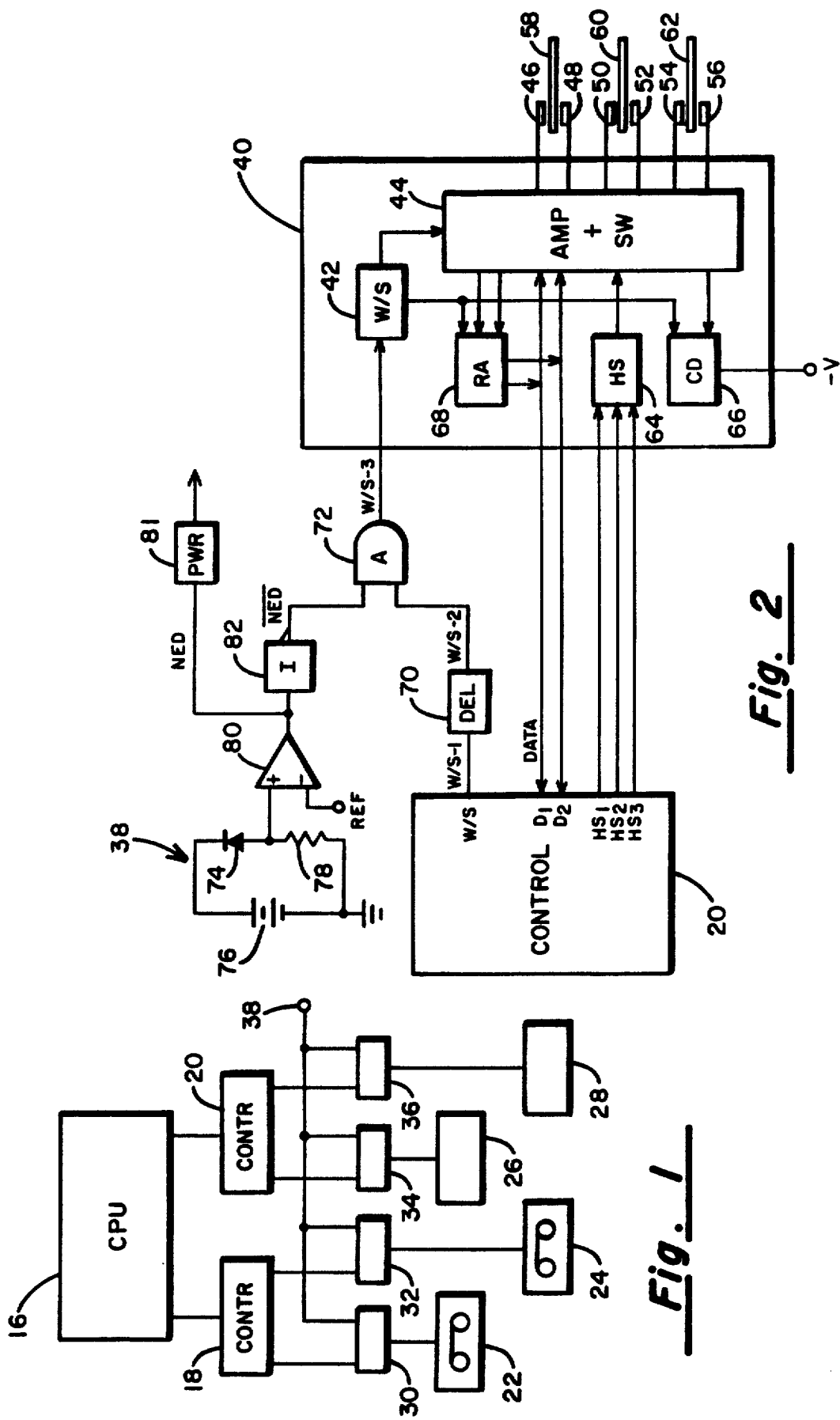
FIG. 1 is a diagrammatic representation of a data processing system constructed in accordance with the present invention.
FIG. 2 is a more detailed schematic view of a portion of FIG. 1.

Turning now to the drawings, there is shown in FIG. 1 a system or configuration for electronically processing and storing data. The system includes a central processing unit or computer 16 and controllers 18 and 20 coupled to the computers. Each of the controllers governs the operation of peripheral equipment for the recording, storage, and erasure of data in magnetic form. In particular, controller 18 couples magnetic tape drives 22 and 24 to computer 16, and controller 20 couples the computer and disk drives 26 and 28.

The system further includes four intermediate circuits at 30, 32, 34 and 36, one coupled between its associated controller and each of the peripheral storage devices. A radiation detector 38 is capable of generating two alternative signals as its output, depending upon whether it senses a level of radiation above or below a predetermined level. Detector 38 provides its output to each of intermediate circuits 30–36. When sensing radiation above the predetermined level, the detector provides an output to intermediate circuits 30–36 which prevents controllers 18 and 20 from enabling their associated peripheral storage devices to receive data from computer 16. So long as detector 38 senses radiation at less than the predetermined level, it provides an output to the intermediate circuits which permits the coupling of computer 16 and the storage devices to record data.

The intermediate circuitry associated with controller 20 and disk drive 26 is shown in greater detail in FIG. 2. The remaining intermediate circuits are substantially identical. Controller 20 has several terminals electrically coupled to selected contacts of a read/write preamplifier semiconductor chip 40, which governs the interaction of the controller and drive. More particularly, chip 40 includes a write select circuit 42 providing its output to a transducer interface circuit 44. The interface circuit includes write current switches used in recording operations to direct electronic data signals to a selected one of six magnetic transducers 46–56. This results in the recording of the data on a selected side of one of three rotatable magnetic disks 58–62 in disk drive 26. Each of disks 58, 60 and 62 has two surfaces for recording data. On each of the surfaces, data is recorded in designated surface area portions or sectors, with other surface areas on the disk used as servo or position control areas. The transducer is selected based on input to the interface circuit from a head select (HS) circuit 64 on semiconductor chip 40. The amount of current supplied to the selected transducer for writing data is controlled by a current diverter circuit 66, coupled to a negative bias source V− located off the chip.

Transducer interface circuit 44 further includes differential amplifiers used during reading operations. The output of the differential amplifiers is provided to a read amplifier (RA) circuit 68 on the chip.

The output of RA circuit 68 is provided to controller 20 at two terminals respectively labeled $D_1$ and $D_2$. These controller terminals also provide data to transducer interface circuit 44 during recording operations. Three terminals, respectively labeled $HS_1$, $HS_2$ and $HS_3$, provide their output to head select circuit 64 to determine the location in the drive at which data is to be stored. Finally, the controller terminal labeled W/S provides a write select signal, i.e. a write enable signal to write select circuit 42. In the absence of the enable signal, disk drive 26 is effectively isolated from the controller and no information can be written on any of the disks.

The write select signal is not provided directly to semiconductor chip 40, but rather through a delay circuit 70 and an AND logic gate 72 which are radiation resistant in the sense that they are either radiation hardened or fail safe. When made to fail safe, this circuitry is designed to fail in a manner which prevents alteration of data stored on the disks. AND gate 72 also receives an input based on whether detector 38 is sensing an unacceptable level of radiation. More particularly, detector 38 includes a P-type/insulative/N-type or "PIN" diode 74, reversed biased by a voltage source 76. A resistance 78 is coupled between diode 74 and ground. Diode 74 detects the "prompt gamma" or gamma ray component of a nuclear explosion. As previously mentioned, the gamma ray component has a velocity near that of light, and thus is the first indication of a nuclear event to arrive at relatively remote locations.

A comparator amplifier 80 receives the output of detector 38 at is positive terminal, and receives a reference voltage at its negative input terminal. The current conducted through diode 74 increases responsive to increases in the gamma ray component, thus to change the voltage input to the positive terminal of comparator 80.

The reference voltage level is set, based upon a predetermined level of radiation selected as a maximum acceptable level for continued data recording operations. Whenever the voltage to comparator 80 from detector 38 exceeds the reference voltage, the comparator output is a high level logic signal NED, i.e. "nuclear event detected". The NED signal can be provided to disable power as indicated at 81. Conversely, when the voltage to the positive terminal of the comparator is less than or equal to the reference voltage, the digital output of comparator 80 is the low logic level. The comparator output is provided to an inverter 82, with the inverter output (inverse NED or $\overline{NED}$) provided as an input to AND gate 72. Interchanging the inputs to comparator 80 would cause it to generate $\overline{NED}$ directly, without inverter 82.

The output of AND gate 72 is either the high level logic signal, i.e. the enable signal for recording operations, or the low logic level which functions as a disabling signal to prevent recording. AND gate 72 outputs the enable signal only if both of its inputs, signals $\overline{NED}$ and W/S, are high.

Figure 3:
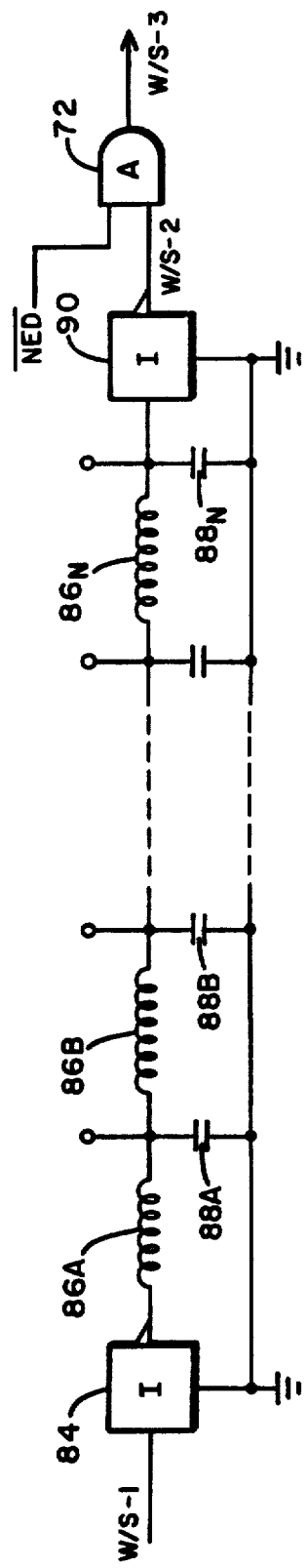
FIG. 3 is a schematic view of a delay circuit employed in the system of FIG. 1.

The purpose of delay circuit 70 is to delay the propagation of the W/S signal from controller to AND gate 72 a sufficient amount of time to enable the detection of unacceptably high level radiation by detector 38 and propagation of the resultant $\overline{NED}$ signal to the AND gate, prior to arrival of the W/S signal. The preferred delay circuit, illustrated in FIG. 3, is a radiation hardened lumped LC delay line including a series of inductances, each coupled to ground through an associated capacitance. The signal W/S is provided to an inverter 84 from the controller, with the inverted signal propagated along a series of inductors 86A, 86B ... 86N, and associated capacitors 88A, 88B ... 88N. The signal is inverted at an inverter 90 which provides the signal W/S as in input to the AND gate. Inverters 84 and 90 are useful for connection to other logic circuitry, but can be eliminated if desired. The propagation time of the signal through delay circuit 70 of course depends upon the number of inductor/capacitor pairs, as well as the specific inductance and capacitance values.

Figure 4:
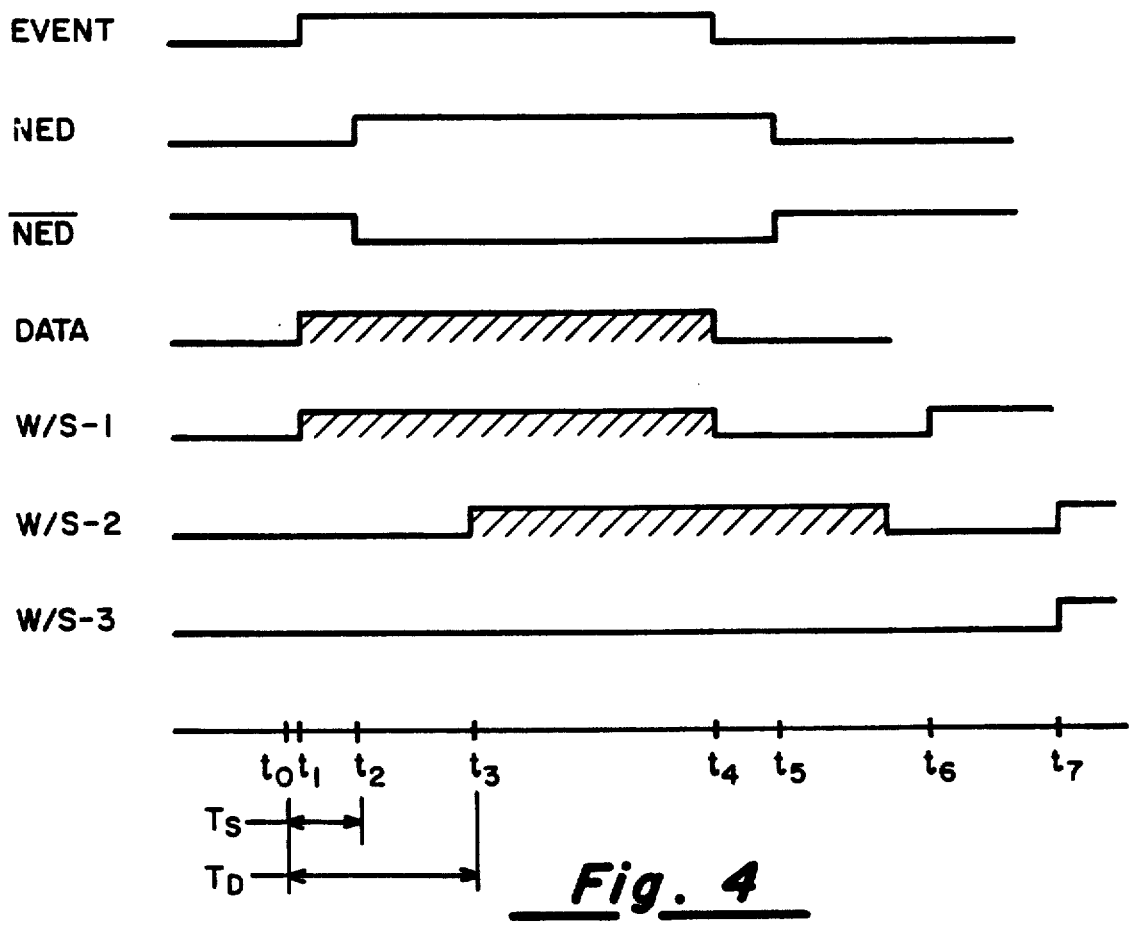
FIG. 4 is timing diagram illustrating operation of the system responsive to the sensing of nuclear radiation.

Operation of the intermediate delay and sensing circuitry can be further understood from the timing diagram in FIG. 4, in which a nuclear event is assumed to occur at time $T_O$. The data processing system is assumed to be sufficiently remote from the center of the event to escape physical damage from the shock or thermal effects of the event, but sufficiently close to experience unacceptably high levels of radiation. Since the gamma ray component travels at virtually the speed of light, initial radiation exposure occurs virtually simultaneously with the event. The hatching in the FIGURE indicates signals possibly effected beginning at point $T_1$ by the radiation and thus at risk of being "false". The data signals and W/S−1, i.e. the write enable signal leaving controller 20, are subject to this risk at the onset of the event.

The event is not sensed immediately upon its arrival, however. In particular, a finite amount of time, perhaps thirty (30) nanoseconds or so, is required for diode 74 to conduct increased current responsive to sensing the higher level of gamma rays, and for propagation of the detector output through the comparator and inverter. This time period, namely $T_S$, is from point $T_O$ to $T_2$. Accordingly, in the absence of delay circuit 70, there is a risk of semiconductor chip 40 receiving a signal enabling the recording of false data.

The delay circuit virtually eliminates this risk. The line W/S−2 represents the write select signal after propagation through the delay circuit. The delay circuit output is not subject to risk of going false until a time $T_3$, which follows time $T_1$ by a delay time of $T_D$ determined by the structure of the delay circuit. Preferably, $T_D$ is about one hundred (100) nanoseconds. Of primary importance is that $T_D$ exceeds the expected sensing delay $T_S$ by a margin sufficient to insure that the input $\overline{NED}$ to AND gate 72 goes low before input W/S−2 goes high. If this condition is satisfied, the output of AND gate 72 (W/S−3) remains low, thus to provide the disabling signal to semiconductor chip 40 and protect disk drive 26 against the recording of false data.

The subsiding of radiation to an acceptable level signals a termination of the event, indicated at point $T_4$, and a virtually coincident termination of the risk of further generation of false data and write select output (W/S−1) of the controller . AND gate 72 can not be enabled, however, at least until $T_5$ when power is restored and the signal $\overline{\text{NED}}$ to the AND gate goes high. When controller 20 issues a write select signal at $T_6$, writing operations can begin at point $T_7$, representing point $T_6$ plus the delay period of $T_D$.

Should the nuclear event occur during a writing operation, there is a risk of recording false data during the time from points $T_1$ to $T_2$. However, since data on disks 58, 60 and 62 is written in designated data sectors, the sector involved in the particular writing operation is the only sector affected, preserving the integrity of all remaining data.

A salient feature of the present invention is that data on disks 58–62 is protected without radiation hardening CPU 16 or controllers 18 and 20. Thus, the cost of protecting disk drives against radiation is significantly reduced, e.g. as compared to the cost of hardening the circuitry of the computer and controllers..

Figure 5:
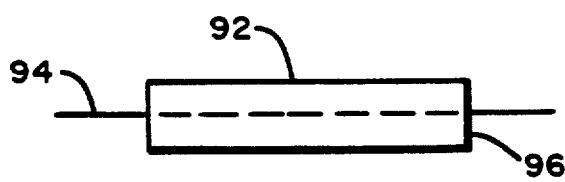
FIG. 5 illustrates an alternative delay device for use in lieu of the delay circuit in FIG. 3.
Figure 6:
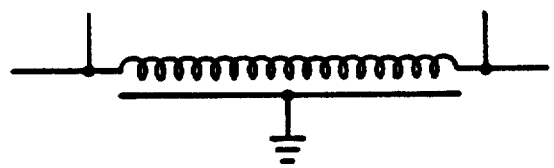
FIG. 6 is a schematic representation of the device in FIG. 5.

FIG. 5 shows an alternative to delay circuit 70, namely a coaxial cable 92 including a central conductor or wire 94 and an annular outer conductor 96, coaxial with and spaced radially apart from the wire. As seen in FIG. 6, the coaxial cable behaves as a continuous series conductance in line with a continuous series inductance in line with a distributive capacitance to ground, and thus is generally similar to the LC delay circuit. The delay time is controlled by the length of coaxial cable 92, as well as the cross sectional areas of conductors 94 and 96 and the materials used.

Figure 7:
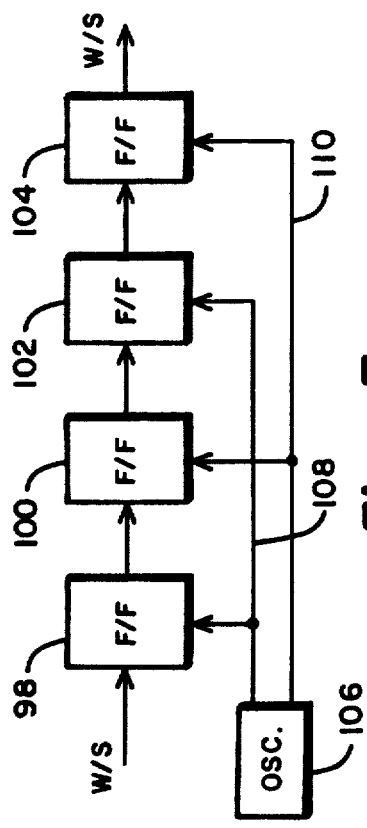
FIG. 7 is a schematic view of an alternative delay circuit usable in lieu of the circuit shown on FIG. 3.

FIG. 7 illustrates yet another alternative for the delay circuit. A group of latches or flip/flops 98, 100, 102 and 104 is arranged in series, and an oscillator 106 provides clocking inputs to the latches. A first phase output 108 of the oscillator is provided to latches 98 and 102, while a second and time offset phase 110 is provided to latches 100 and 104. Thus, the write enable signal is clocked in succession through the latches, with total delay time controlled by the frequency of oscillator 106 and the number of latches employed. The latches and oscillator preferably are formed on a single semiconductor and oscillator preferably are formed on a single semiconductor chip which must be of a radiation resistant or hardened construction. It should be noted that this alternative is substantially more expensive than the delay means illustrated in FIGS. 3 and 5.

Figure 8:
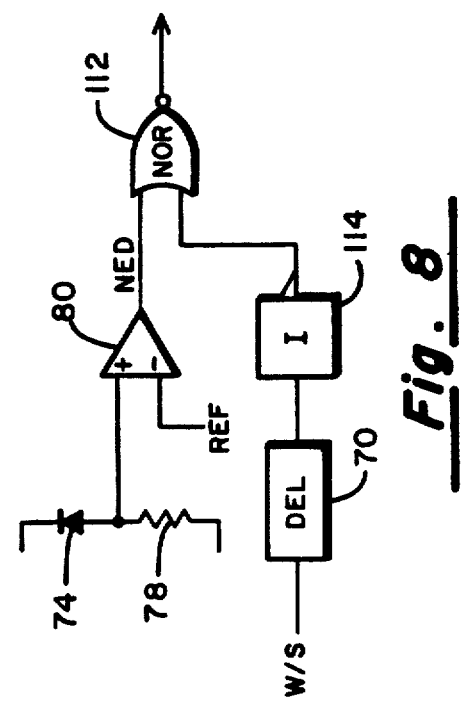
FIG. 8 is a schematic view of a signal transmission circuit used in lieu of that illustrated in FIG. 1.

FIG. 8 illustrates an alternative intermediate circuit between the controller 20 and semiconductor chip 40, in which a NOR logic gate 112 is employed in lieu of AND gate 72. The output of comparator 80 is provided directly to NOR gate 112 rather than inverted, and an inverter 114 is coupled between delay circuit 70 and the NOR gate. The output of NOR gate 112 is high, i.e. enabling, only when both of its inputs are at the low logic state or voltage level, corresponding to the absence of an unacceptably high radiation level and the presence of the write select signal.

While the foregoing embodiments have been presented in connection with disk drive 26, it is to be understood that the intermediate circuitry functions in substantially the same manner when employed in connection with magnetic tape drives or other peripheral storage devices. Regardless of the specific device employed, the intermediate delay and sensing circuitry insures that data previously written remains isolated from potential erroneous data and write enable signals from the associated controller, by positively preventing the storage device from receiving a write enable signal at risk due to unacceptably high radiation, or alternatively confirming acceptable levels prior to providing the write enable signal. Should unacceptably high radiation occur during a writing operation, damages is limited to the involved sector, preserving the integrity of remaining, previously recorded data.

What is claimed is:

1. An apparatus for preserving the integrity of electronically recorded data in the event of exposure to radiation, including:
   a memory for storing information and a data entry means operatively associated with said memory, said data entry means, when enabled, recording information onto said memory responsive to receiving electrical data signals representing said information;
   a control means operatively associated with said data entry means for providing said electrical data signals to said data entry means and for generating a first control signal to enable said data entry means to record the information;
   a signal transmitting element having alternative active and inactive states and operatively connected between the control means and the data entry means, said signal transmitting element providing an enabling signal to the data entry means when in the active state and receiving the first control signal, said signal transmitting element providing a disabling signal to said data entry means when in the inactive state;
   a radiation detector for sensing radiation and for generating a second control signal responsive to sensing radiation of at least a predetermined level, and a means for electrically coupling the detector and signal transmitting element to provide the second control signal to the signal transmitting element and thereby force the signal transmitting element into said inactive state; and
   a radiation resistant delay means electrically coupled between the control means and the signal transmitting element; for delaying the propagation of the first control signal from the control means to the signal transmitting element, by a predetermined amount of time at least as long as the time for propagation of said second control signal from the radiation detector to the signal transmitting element.

2. The apparatus of claim 1 wherein:
   said first and second control signals are provided to the signal transmitting element as digital logic signals from the control means and from the detector connecting means, respectively, each control signal comprising one of two alternative voltage levels of its associated logic signal; and
   wherein said enable signal and disable signal comprise, respectively, the alternative voltage levels of a digital logic signal from the signal transmitting element to the data entry means.

3. The apparatus of claim 2 wherein:
   said signal transmitting element comprises an AND logic gate with inputs corresponding to said first and second control signals in which said first control signal is the high voltage level of its associated logic signal, and the second control signal is the low voltage level of its associated logic signal, said enable and disable signals comprising, respectively, the high voltage and low voltage levels of their associated logic signals.

4. The apparatus of claim 2 wherein:
   said signal transmitting element comprises a NOR logic gate, said first control signal comprises the low voltage level of its associated logic signal, said second control signal comprises the high voltage level of its associated logic signal, and said enable and disable signals comprise respectively the high and low voltage levels of their associated digital logic signal.

5. The apparatus of claim 2 wherein:
said delay means comprises an LC delay line.

6. The apparatus of claim 2 wherein:
said delay means comprises a distributed delay line.

7. The apparatus of claim 6 wherein:
said distributed delay line consists of a coaxial cable.

8. The apparatus of claim 2 wherein:
said delay means comprises a plurality of latches, circuitry connecting the latches in series, and a means for clocking the latches.

9. The apparatus of claim 8 wherein:
said clocking means comprises an oscillator, and wherein said oscillator and latches are formed on a single, radiation resistant semiconductor chip.

10. The apparatus of claim 2 wherein:
said memory comprises a rotatable disk having a magnetizable data recording surface segmented into data recording sectors, and said data entry means includes a read/write preamplifier and at least one magnetic transducer supported movably with respect to the disk and proximate the data recording surface.

11. The apparatus of claim 1 wherein:
said radiation detector comprises a PIN diode and means for applying a reverse bias to the diode, and wherein the connecting means includes means for sensing the current through said diode and generating said second control signal responsive to sensing a predetermined level of electrical current.

12. The apparatus of claim 1 wherein:
said radiation detector senses the gamma ray component of nuclear radiation.

13. The apparatus of claim 1 wherein:
said radiation detector senses the electromagnetic pulse component of nuclear radiation.

14. The apparatus of claim 1 wherein:
said predetermined amount of time is at least one hundred nanoseconds.

15. An apparatus for protecting the integrity of data electronically recorded on a data recording surface of a magnetic memory in the event of abnormally high levels of radiation, including:
a memory for storing data responsive to receiving electrical data signals, a controller for providing electrical signals representing said data to said memory means and further for providing a write enable signal for enabling the memory to receive said electrical signals;
a signal gating means receiving said write enable signal as an input, and operable in two alternative conditions: an active condition for providing the write enable signal to said memory responsive to receiving the write enable signal from the controller, and an inactive condition for providing a disabling signal to the memory, thereby to prevent the memory from receiving said electrical signals;
a detection means for sensing radiation and for generating a forcing signal whenever sensing radiation of at least a predetermined level, and providing said forcing signal as an input to said gating means, thus to force said gating means into the inactive condition responsive to the sensing of radiation at said predetermined minimum level; and
a radiation resistant signal delay means for receiving said write enable signal from the controller and providing the write enable signal to said signal gating means, and for delaying said write enable signal for a predetermined amount of time at least as long as the propagation time of said forcing signal from the detecting means to the gating means.

16. The apparatus of claim 15 wherein:
said delay means comprises an LC delay circuit.

17. The apparatus of claim 15 wherein:
said delay means comprises a coaxial cable connected to said controller and to said gating means.

18. The apparatus of claim 15 wherein:
said delay means comprises a plurality of latches, a means for electrically coupling the latches in series, and an oscillator providing a clocking input to each of the latches.

* * * * *